(12) United States Patent
Oishi et al.

(10) Patent No.: US 7,619,466 B2
(45) Date of Patent: Nov. 17, 2009

(54) QUADRATURE DEMODULATOR

(75) Inventors: Sadatoshi Oishi, Fuji (JP); Nobuo Murofushi, Susono (JP); Masakazu Kato, Numazu (JP)

(73) Assignee: Toshiba Tec Kabushiki Kaisha (JP)

( * ) Notice: Subject to any disclaimer, the term of this patent is extended or adjusted under 35 U.S.C. 154(b) by 286 days.

(21) Appl. No.: 11/881,876

(22) Filed: Jul. 30, 2007

(65) Prior Publication Data

US 2008/0024208 A1 Jan. 31, 2008

(30) Foreign Application Priority Data

Jul. 31, 2006 (JP) .............................. 2006-208835

(51) Int. Cl.
*H04L 27/22* (2006.01)
(52) U.S. Cl. ...................................... 329/304; 329/306
(58) Field of Classification Search ................. 329/304, 329/306, 308; 375/329
See application file for complete search history.

(56) References Cited

U.S. PATENT DOCUMENTS

| | | | | |
|---|---|---|---|---|
| 3,594,651 A | | 10/1969 | Wolejsza, Jr. | |
| 5,349,332 A | * | 9/1994 | Ferguson et al. | 340/572.2 |
| 5,649,296 A | * | 7/1997 | MacLellan et al. | 455/39 |
| 5,777,561 A | * | 7/1998 | Chieu et al. | 340/10.32 |
| 5,784,686 A | * | 7/1998 | Wu et al. | 455/45 |
| 6,122,329 A | * | 9/2000 | Zai et al. | 375/329 |
| 6,501,807 B1 | | 12/2002 | Chieu et al. | |
| 7,486,131 B2 | * | 2/2009 | Murofushi et al. | 329/304 |

FOREIGN PATENT DOCUMENTS

EP 1557962 7/2005

* cited by examiner

*Primary Examiner*—Joseph Chang
(74) *Attorney, Agent, or Firm*—Harness, Dickey & Pierce, P.L.C.

(57) ABSTRACT

A quadrature demodulator includes a reception section which receives a signal transmitted by an RFID tag and containing a specific pattern and data following the specific pattern and multiplies the reception signal by a local signal to generate an I-signal, while multiplying the reception signal by the local signal shifted in phase by 90 degrees to generate a Q-signal, a first demodulating circuit which squares the I- and Q-signals and adding the resulting I- and Q-signals together to generate data on the basis of the addition result, a second demodulating circuit which detects the specific pattern in the I- and Q-signals to decode the data following one of the detected specific patterns, and a control section which selects one of the first and second demodulating circuits in accordance with a gain determined by the result of the addition between the values of the squared I- and Q-signals.

13 Claims, 6 Drawing Sheets

QUADRATURE DEMODULATOR

CROSS-REFERENCE TO RELATED APPLICATIONS

This application is based upon and claims the benefit of priority from prior Japanese Patent Application No. 2006-208835, filed Jul. 31, 2006, the entire contents of which are incorporated herein by reference.

BACKGROUND OF THE INVENTION

1. Field of the Invention

The present invention relates to a quadrature demodulator that creates an I-signal and a Q-signal of a baseband to demodulate a reception signal.

2. Description of the Related Art

A radio-frequency identification (RFID) communication device makes radio communication with a transponder called an RFID tag. The RFID communication device transmits data to the RFID tag using a modulated radio wave, and after the end of the data transmission, transmits a continuous wave (CW). In contrast, the RFID tag carries out backscatter modulation by changing a reflection amount of the continuous wave from the RFID communication device, to transmit data to the RFID communication device. The RFID communication device receives a backscatter modulation wave and reads data on the RFID tag.

The RFID communication device comprises a transmitting section and a receiving section. In the transmitting section, a modulator modulates data, and an amplifier amplifies the data to be transmitted to the RFID communication device through an antenna. In the receiving section, a direct conversion receiver extracts a baseband signal from a high-frequency signal that is the signal received by an antenna, and then demodulates the baseband signal to derive data.

When a quadrature demodulator is provided for direct conversion, the reception signal and a local signal having a frequency that is equal to that of a carrier of the reception signal are input to a mixer to create an in-phase (I) signal of a baseband, and the reception signal and a signal shifted in phase by 90 degrees with respect to the local signal are input to a mixer to create a quadrature-phase (Q) signal of a baseband.

The amplitudes of the I- and Q-signals depend on a phase difference between the reception signal and the local signal. The maximum amplitude of the I-signal minimizes the amplitude of the Q-signal. The minimal amplitude of the I-signal maximizes the amplitude of the Q-signal. When the Q-signal has a minimal value of 0, the I-signal has the maximum amplitude. Thus, the use of the I-signal enables reproduction of data received. In contrast, when the I-signal has a minimal value of 0, the Q-signal has the maximum amplitude. Thus, the use of the Q-signal enables reproduction of data received. Further, there is a case in which the phases of the I- and Q-signals are inverted depending on the phase difference between the reception signal and the local signal.

A known reception data reproduction method that uses the direct conversion quadrature demodulator compares the amplitude of the I-signal with that of the Q-signal to select the signal having a greater amplitude, and then reproduces reception data (see, for example, U.S. Pat. No. 6,501,807 B1).

In the method described in U.S. Pat. No. 6,501,807 B1, the signal having a greater amplitude is selected to reproduce the reception data as a result of comparison between the amplitudes of the I-signal and the Q-signal. Accordingly, when the amplitude of the I-signal significantly differs from that of the Q-signal, a sufficient amplitude that enables reproduction without any difficulty is obtained in the selected signal.

However, when the amplitude of the I-signal is substantially equal to that of the Q-signal, either of the signals may be selected, but reproduction of reception data must be conducted at an amplitude that is half of that of the reception signal. Thus, disadvantageously, the reception signal at a low level is likely to suffer from noise, resulting in the frequent noise-induced incorrect reproduction of the reception data.

BRIEF SUMMARY OF THE INVENTION

The present invention has been made in view of the above circumferences. An object of the present invention is to provide a quadrature demodulator that can minimize the adverse effect of noise even with the reduced level of a reception signal to reduce the possible noise-induced incorrect reproduction of reception data.

According to the present invention, a quadrature demodulator comprises reception means for receiving a signal that is transmitted by an RFID tag and contains a specific pattern and data following the specific pattern, generating an I-signal by multiplying the reception signal and a local signal, and generating a Q-signal by multiplying the reception signal and a local signal shifted in phase by 90 degrees, first demodulating means for squaring each of the I- and Q-signals and adding the resulting I- and Q-signals together to generate data on the basis of the addition result, second demodulating means for detecting the specific pattern in each of the I- and Q-signals to decode the data following one of the detected specific patterns, and selecting means for selecting one of the first demodulating means and the second demodulating means in accordance with a gain determined by the result of the addition between the value of the squared I-signal and the value of the squared Q-signal. For example, the first demodulating means comprises an I-signal squaring section which squares the I-signal, an adding section which adds an output from the I-signal squaring section and an output from a Q-signal squaring section, an automatic gain control section which controls gain of the I- and Q-signals to obtain the gain determined by the result of the addition carried out by the adding section, and a data generating section which generates data by inverting a signal level of a signal output by the adding section as the addition result, with respect to a predetermined threshold used as a reference. The second demodulating means comprises, for example, I-signal specific-pattern detecting means for detecting the specific pattern in the I-signal, Q-signal specific-pattern detecting means for detecting the specific pattern in the Q-signal, and decoding means for decoding the data following the specific pattern detected by one of the specific-pattern detecting means.

The present invention can provide a quadrature demodulator that can minimize the adverse effect of noise even with the reduced level of a reception signal to reduce the possible noise-induced incorrect reproduction of reception data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An RFID tag communication device including a quadrature demodulator according to an embodiment of the present invention will be described with reference to the accompanying drawings.

Figure 1:
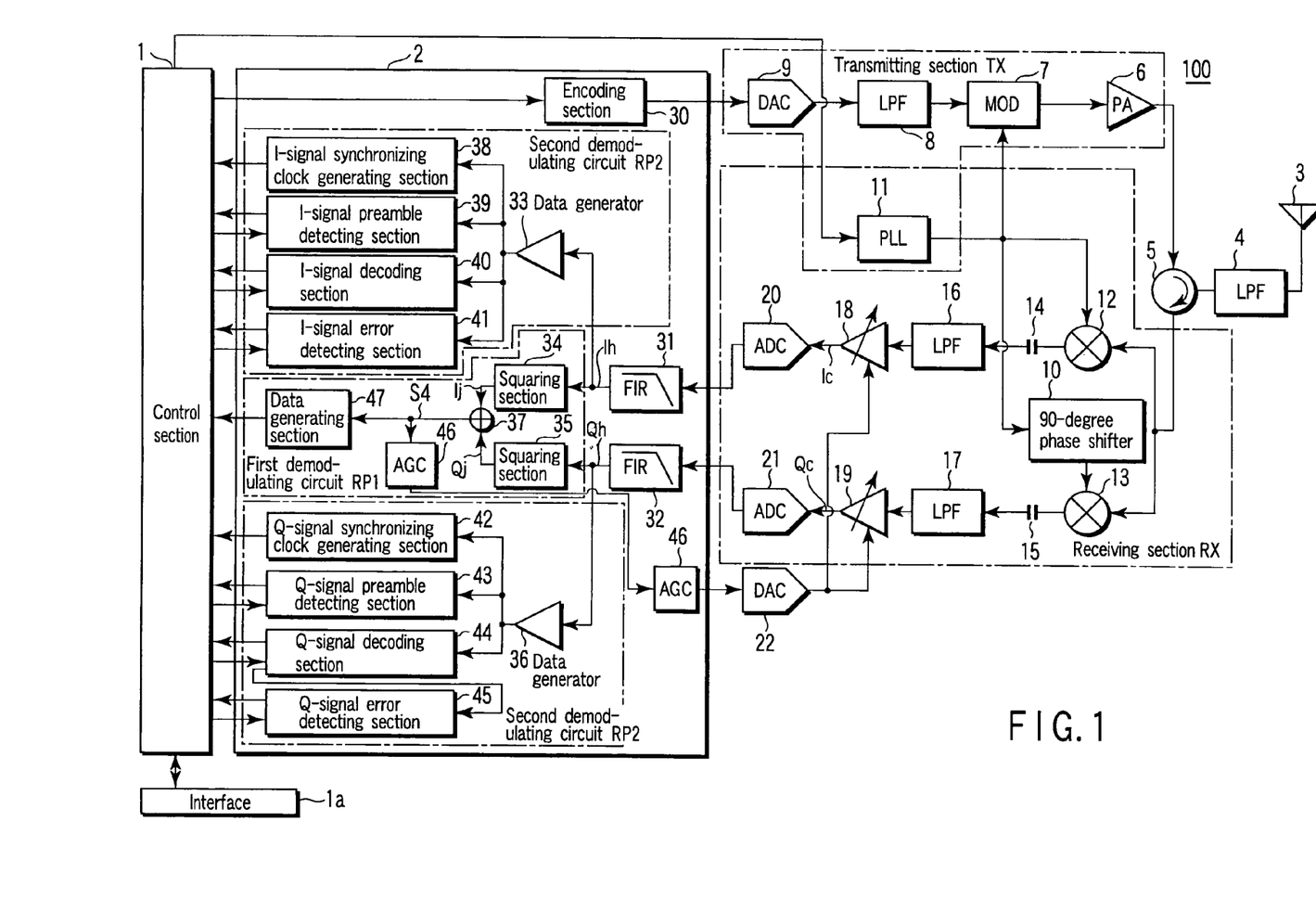
FIG. 1 is a block diagram showing the configuration of an RFID tag communication device including a quadrature demodulator according to an embodiment of the present invention.

FIG. 1 is a block diagram showing the configuration of an RFID tag communication device 100. The RFID tag communication device 100 has a control section 1, a digital signal processing section 2 that processes transmission and reception signals, a transmitting section TX, and a receiving section RX.

The control section 1 includes a central processing unit (CPU) and a memory and operates in accordance with pre-stored programs. The control section 1 is connected to the digital signal processing section 2 and performs an output and input operation of data to be transmitted to and received from the digital signal processing section 2 in data communication with an RFID tag.

In addition, the control section 1 controls a phase-locked loop (PLL) section 11 to output a local frequency equal to a carrier frequency. The control section 1 is connected to an interface 1a and has a function of making wired communication with higher-level equipment such as a personal computer via the interface 1a.

The digital signal processing section 2 comprises an encoding section 30 that encodes a transmission signal output from the control section 1. In the encoding section 30, the transmission signal is encoded using the Manchester code or the FM0 code, for example. The Manchester code is an encoding scheme of providing a signal that rises in the center of a bit for data "0" and falls in the center of a bit for data "1". In other words, data "0" is expressed by the code of (0,1), and data "1" is expressed by the code of (1,0). The FM0 code is an encoding scheme of proving a signal that is always inverted at the boundary of bits but is also inverted in the center of the bit for data "0".

The transmitting section TX includes a digital-to-analog converter (DAC) 9 and a low-pass filter (LPF) 8 which subject a transmission signal to digital-to-analog conversion to obtain an analog transmission signal. The transmitting section TX further includes a modulator (MOD) 7 that performs amplitude modulation using the analog transmission signal, a power amplifier (PA) 6 that amplifies the power of the transmission signal obtained from MOD 7 as a result of amplitude modulation, and a phase-locked loop (PLL) section 11 that supplies a local signal to the MOD 7. The MOD 7 amplitude-modulates the local signal from PLL section 11 by the transmission signal supplied from the encoding section 30 via DAC 9 and LPF 8. The transmission signal obtained from the MOD 7 is power-amplified by the PA 6, and then supplied to a directional coupler 5 such as a circulator. The directional coupler 5 supplies the transmission signal to an antenna 3 via LPF 4. The antenna 3 radiates the transmission signal as an electromagnetic wave.

The receiving section RX is connected to the directional coupler 5. The reception section RX is configured to perform a reception process of direct conversion to baseband signals, and includes the PLL section 11, first and second mixers 12 and 13, first and second DC-cut capacitors 14 and 15, first and second low-pass filters (LPF) 16 and 17, first and second variable gain amplifiers 18 and 19, first and second analog-to-digital converters (ADC) 20 and 21, and a 90-degree phase shifter 10. The ADCs 20 and 21 performs analog-to-digital conversion on received baseband signals.

The antenna 3 receives a radio wave transmitted by an RFID tag and supplies the reception signal to the directional coupler 5 via the low-pass filter 4. The directional coupler 5 supplies the reception signal to the receiving section RX. In the receiving section RX, the reception signal from the directional coupler 5 is input to each of the first and second mixers 12 and 13.

The local signal from the PLL section 11 is input to the first mixer 12. The local signal from the PLL section 11 is shifted in phase by 90 degrees at the 90-degree phase shifter 10 and input to the second mixer 13.

The first mixer 12 mixes the reception signal with the local signal to generate an I-signal corresponding to an in-phase component with respect to the local signal. The second mixer 13 mixes the reception signal with the local signal with the phase shifted by 90 degrees to generate a Q-signal corresponding to a quadrature-phase component with respect to the local signal.

The first DC-cut capacitor 14 removes the DC component of the I-signal output from the first mixer 12 and inputs the resulting signal to the first LPF 16. The first LPF 16 removes an unwanted high-frequency component from the signal. The first variable gain amplifier 18 then amplifies the signal. The first ADC converts the signal into a digital signal Ih and then inputs the digital signal Ih to the digital signal processing section 2.

Similarly, the second DC-cut capacitor 15 removes the DC component of the Q-signal output from the second mixer 13 and inputs the resulting signal to the second LPF 17. The second LPF 17 removes an unwanted high-frequency component from the signal. The second variable gain amplifier 19 then amplifies the Q-signal Qc, which is free from the unwanted high-frequency component. The second ADC 21 converts the Q-signal Qc into a digital signal Qh and then inputs the digital signal Qh to the digital signal processing section 2.

To reliably extract data from a modulated reception signal, a sampling time interval used for the first and second ADCs 20 and 21 needs to be set shorter than the half of the shortest time for which the level of the modulated reception signal remains unchanged. Here, the sampling time interval is set equal to the quarter of the shortest time for which the level of the modulated reception signal remains unchanged. In other words, a sampling frequency is set four times as great as the minimum frequency at which the level of the modulated reception signal remains unchanged.

The band of the I-signal Ih, the digital signal resulting from the conversion performed by the first ADC 20, is limited by a digital filter 31 such as a finite impulse response (FIR) filter.

Similarly, the band of the Q-signal Qh, the digital signal resulting from the conversion performed by the second ADC 21, is limited by a digital filter 32.

Now, the digital signal processing section 2 will be described. The digital signal processing section 2 includes digital filters 31 and 32 to which signals from the first and second ADCs are input, first and second demodulating circuits RP1 and RP2; the digital signal processing section 2 uses these components to execute appropriate processing.

The first demodulating circuit RP1 will be described. The first demodulating circuit RP1 is composed of an I-signal squaring section 34 that squares the signal Ih, a Q-signal squaring section 35 that squares the signal Qh, an adding section 37 that adds signals from the I-signal squaring section 34 and the Q-signal squaring section 35 together, a data generating section 47 having a function of generating a signal remaining at a high level while a signal S4 output by the adding section 37 has a value equal to or greater than a predetermined threshold, and for every rise in the signal, inverting the signal level to generate data, and an automatic gain control (AGC) 46 that, when the amplitude of the signal from the adding section 37 is at a level lower than a predetermined threshold, controls the output voltage of the DAC 22 to increase the gain of each of the first and second variable gain amplifiers 18 and 19.

Figure 2:
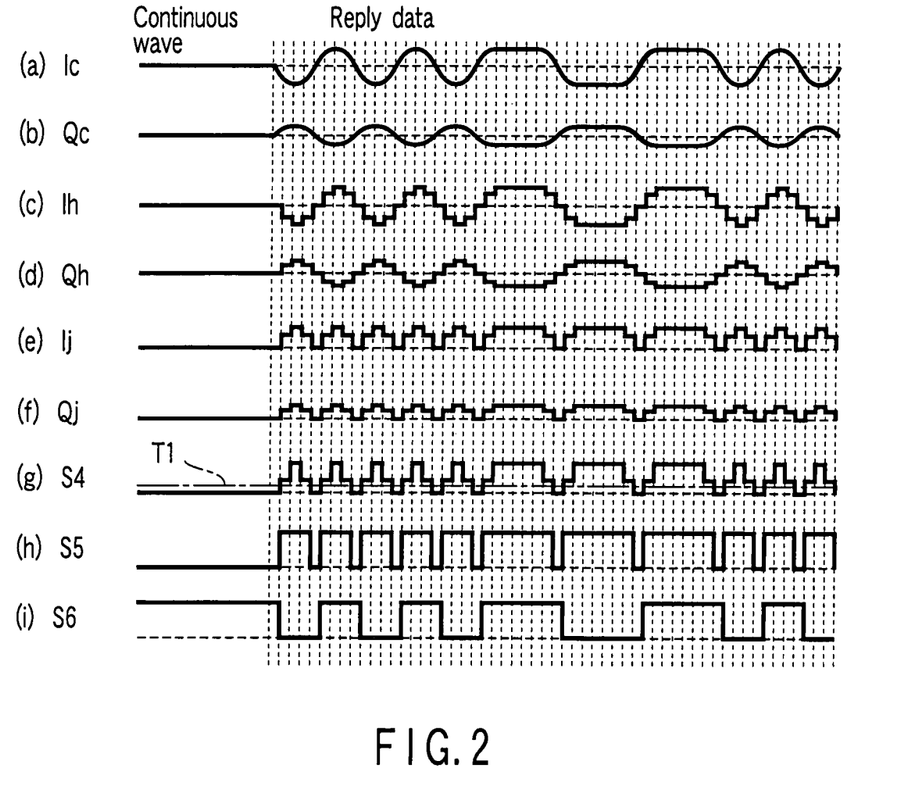
FIG. 2 is a diagram showing output waveforms obtained from the respective sections of the RFID tag communication device shown in FIG. 1, during reception data reproduction.

FIG. 2 is a diagram showing output waveforms from the respective sections of the quadrature demodulator during reception data reproduction. The first LPF 16 outputs a signal Ic shown in (a) of FIG. 2, and the first ADC 20 samples and converts the signal Ic into digital data. The digital filter 31 then limits the band of the digital data, resulting in a signal Ih shown in (c) of FIG. 2. The second LPF 17 outputs a signal Qc shown in (b) of FIG. 2, and the second ADC 21 samples and converts the signal Qc into digital data. The digital filter 32 then limits the band of the digital data, resulting in a signal Qh shown in (d) of FIG. 2.

The signals Ih and Qh from the first and second ADCs 20 and 21 are input to the digital signal processing section 2 for digital signal processing. In the digital signal processing section 2, the I-signal squaring section 34 squares and converts the signal Ih into a signal Ij shown in (e) of FIG. 2. The Q-signal squaring section 35 squares and converts the signal Qh into a signal Qj shown in (f) of FIG. 2. The adding section 55 then adds the signals Ij and Qj together to create a signal S4 shown in (g) of FIG. 2.

Subsequently, the data generating section 47 converts signal S4 into one of two levels on the basis of a threshold T1; the data generating section 47 has the function of generating a signal kept at the high level while signal S4 output by the adding section 37 has a value equal to or greater than the predetermined threshold, and inverting the signal level for each rise of the signal to generate data. That is, signal S5 shown in (h) of FIG. 2 is generated by making the level of signal S4 low when signal S4 has a value smaller than threshold T1, while making the level of signal S4 high when signal S4 has a value equal to or greater than threshold T1. The generating section 47 further executes a process of inverting the signal level at the rise of signal S5 to generate a signal S6 shown in (i) of FIG. 2. Thus, a demodulation signal S6 for the reception signal received by the antenna 2 is obtained.

When the amplitude of signal S4 from the adding section 37 is at a level lower than threshold T1, the AGC 46, provided in the digital signal processing section 2, controls the output voltage of the DAC 22 to increase the gain of each of the first and second variable gain amplifiers 18 and 19. If the amplitude of signal S4 is always at a level equal to or higher than threshold T1, the AGC 46 controls the output voltage of the DAC 22 to reduce the gain of each of the first and second variable gain amplifiers 18 and 19. The digital signal processing section 2 acquires an RSSI value for the received signal on the basis of the amplification factor of each of the first and second variable gain amplifiers 18 and 19 and the amplitude of signal S4 so that the control section I can perform a carrier sense operation.

Thus, a quadrature demodulator reproducing reception data from a reception signal may use the digital signal processing section 2 internally having the squaring sections 34 and 35, the adding section 37, and the data generating section 47 to execute required digital processing. The quadrature demodulator can thus minimize the adverse effect of noise even with the reduced level of the reception signal, allowing the reception data to be reliably demodulated.

In the present embodiment, the digital signal processing section 2 generates data signal S5 from signal S4 and further generates demodulation signal S6 from signal S5. However, the present invention is not limited to this. Demodulation signal S6 may be generated by executing a process of inverting the signal level at the rise at which signal S4 changes from a value smaller than threshold T1 to a value equal to or greater than threshold T1.

In the present embodiment, the sampling frequency for the first and second ADCs 20 and 21 is four times as high as the minimum frequency at which the level of the reception signal remains unchanged. However, increasing the sampling frequency enables an increase in the frequency difference between the frequency component of the modulated reception signal and the sampling frequency. This advantageously simplifies the configuration of an anti-aliasing filter.

Further, in the present embodiment, preset threshold T1 is used to generate data from signal S4. However, the present invention is not limited to this. Threshold T1 may be obtained using data values present before data generation. As shown in (a) of FIG. 3, data generation may be carried out by using threshold T2 obtained by averaging 6 consecutive samples including the 5 sampling values obtained before the time of the data generation and the sampling value to be subjected to the data generation. Thus averaging the 6 sampling data, that is, taking the time average, makes it possible to cope with a variation in DC level in spite of a failure to deal with a rapid change in time.

Figure 3:
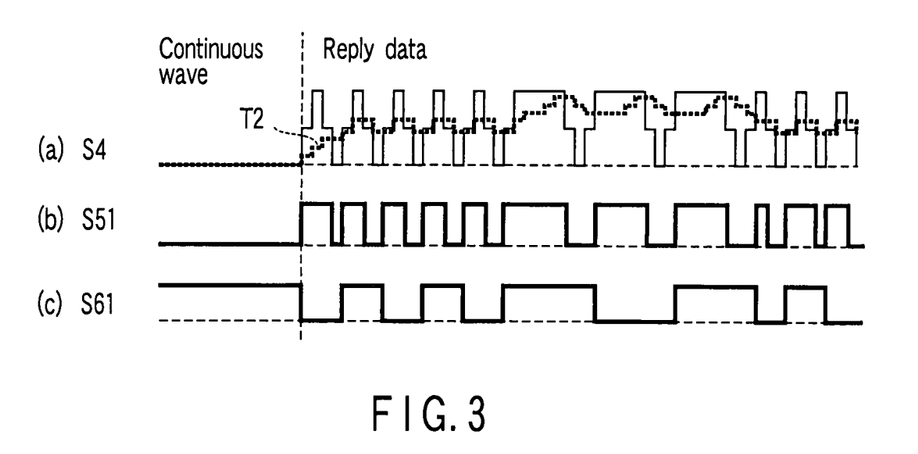
FIG. 3 is a diagram illustrating a method for creating other thresholds during reception data reproduction in the RFID tag communication device shown in FIG. 1.

Thus, threshold T2 varies depending on the value of signal S4, which varies with time. Data generation from signal S4 is carried out with threshold T2 used as a reference. That is, signal S4 is regarded as a low level when signal S4 has a value smaller than threshold T2 and regarded as a high level when signal S4 has a value equal to or greater than threshold T2. Thus, a signal S51 shown in (b) of FIG. 3 is obtained to generate a signal S61 shown in (c) of FIG. 3. The level of signal S61 is inverted at the rise of signal S51. This enables the acquisition of demodulation signal S61 for a backscatter signal received by the antenna 2.

The number of consecutive samples used to calculate the average value needs to be at least the number of consecutive sampling values obtained by each of the first and second ADCs 20 and 21 and exhibiting the maximum value, plus 1.

Increasing the number of samples used to calculate the average value makes it possible to reduce a variation in the level of threshold T2.

Now, the second demodulating circuit RP2 will be described. The second demodulating circuit RP2 has a section that processes the I-signal and a section that processes the Q-signal, the sections having similar configurations. Thus, only the section processing the I-signal will be described, and the section processing the Q-signal will not be described. This section is composed of a data generator 33 that generates data from the I-signal Ih distributively output by the digital filter 31, an I-signal synchronizing clock generating section 38 that receives data of I-signal generated by the data generator 33, an I-signal preamble detecting section 39, an I-signal decoding section 40, and an I-signal error detecting section 41, and uses these components to execute appropriate processing. The I-signal preamble detecting section 39 constitutes means for detecting a specific pattern in the I-signal. The I-signal decoding section 40 and the I-signal error detecting section 45 constitutes means for excluding errors and decoding the I-signal. The control section 1 also is connected to the I-signal synchronizing clock generating section 38, the I-signal preamble detecting section 39, the I-signal decoding section 40, and the I-signal error detecting section 41.

The I-signal Ih output by the digital filter 31 of the digital signal processing section 2 is distributed to the squaring section 34 and the data generator 33. Similarly, the Q-signal Qh output by the digital filter 32 is distributed to the squaring section 35 and the data generator 36.

Data of the I-signal generated by the data generator 33 is supplied to each of the I-signal synchronizing clock generating section 38, I-signal preamble detecting section 39, I-signal decoding section 40, and I-signal error detecting section 41.

Data of the Q-signal generated by the data generator 36 is supplied to each of the Q-signal synchronizing clock generating section 42, Q-signal preamble detecting section 43, Q-signal decoding section 44, and Q-signal error detecting section 45. The Q-signal preamble detecting section 43 constitutes means for detecting a specific pattern in the Q-signal. The Q-signal decoding section 44 and the Q-signal error detecting section 45 constitutes means for excluding errors and decoding the Q-signal.

The I-signal synchronizing clock generating section 38 allows the PLL section 11 to always generate a clock synchronizing with the generated data signal from the data generator 33. The I-signal synchronizing clock generating section 38 supplies the generated clock to the control section 1, the I-signal preamble detecting section 39, the I-signal decoding section 40, the I-signal error detecting section 45, and the like. The Q-signal synchronizing clock generating section 42 allows the PLL section 11 to always generate a clock synchronizing with the generated data signal from the data generator 36. The Q-signal synchronizing clock generating section 42 supplies the generated clock to the control section 1, the Q-signal preamble detecting section 43, the Q-signal decoding section 44, the Q-signal error detecting section 45, and the like.

The I-signal preamble detecting section 39 detects a preamble that is a specific pattern contained in the reception I-signal by comparing the preamble with a preset preamble pattern on the basis of the clock generated by the I-signal synchronizing clock generating section 38. The Q-signal preamble detecting section 43 detects a preamble that is a specific pattern contained in the reception Q-signal by comparing the preamble with a preset preamble pattern on the basis of the clock generated by the Q-signal synchronizing clock generating section 42. Upon detecting the preamble, each of the preamble detecting sections 39 and 43 outputs an appropriate signal to the control section 1.

The control section 1 transmits a signal to the I-signal decoding section 40 and the Q-signal decoding section 44. Each of the decoding sections 40 and 41 decodes the reception signal by, for example, Manchester decoding or FM0 decoding. Each of the decoding sections 40 and 44 supplies data resulting from the decoding to the control section 1. The control section 1 transmits the data to the I-signal error detecting section 45 and the Q-signal error detecting section 45. The error detecting sections 41 and 45 detect errors in the data.

Upon receiving a predetermined number of data bits from each of the decoding sections 40 and 44, the control section 1 transmits an appropriate signal to each of the error detecting sections 41 and 45 to acquire the error detection result from each of the error detecting sections 41 and 45 to check for errors.

Figure 4:
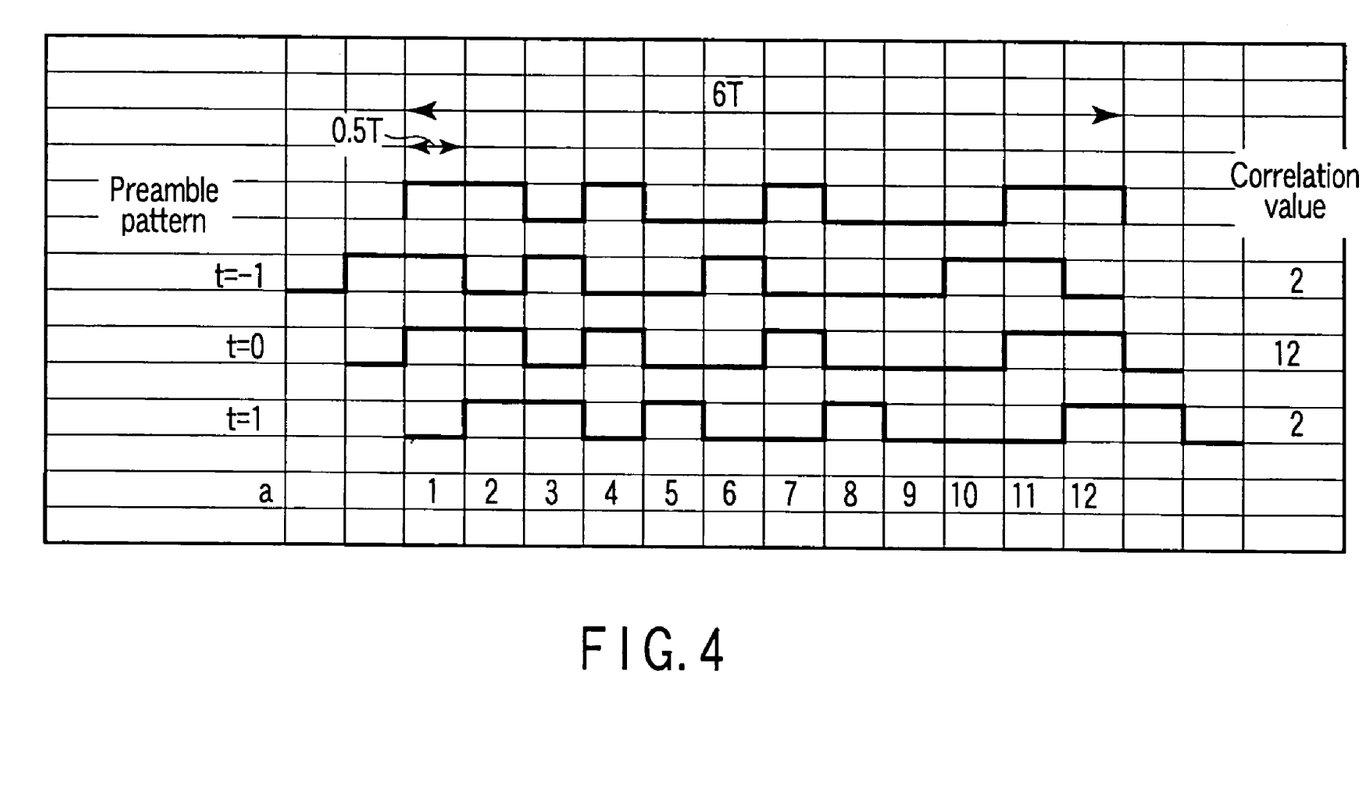
FIG. 4 is a diagram illustrating preamble detection in the RFID tag communication device shown in FIG. 1.

Each of the preamble detecting sections 39 and 43 detects the preamble as shown in FIG. 4. For example, a preamble pattern containing data changing every 0.5 T is preset for a period T corresponding to a transmission rate. A time t=0 is offset from a time t=−1 by 0.5 T, and a time t=1 is offset from the time t=0 by 0.5 T. A correlation value is calculated on the assumption that each of the patterns exhibits a value of 1 at the high level and a value of −1 at the low level.

The preamble pattern is defined as f(a), an input signal is defined as r(a), and reference character a denotes a natural number between 1 and 12. Then, the correlation value is given by:

$$C = \left| \sum_{a=1}^{12} (f(a) \times r(a)) \right|$$

As seen in FIG. 4, the correlation value c has a large value when the patterns match. Even with partly incorrect data, pattern matching can be detected provided that the correlation value is somewhat large. When a threshold for the correlation value c is set at, for example, "10", the preamble is determined to have been detected if the correlation value c is at least 10.

To communicate with an RFID tag, an RFID tag communication device 100 configured as described above transmits a continuous wave to the RFID tag to supply power to the RFID tag. That is, an output from the encoding section 30 is set at the high level to supply a local signal generated by the PLL section 11 to the modulator 7. This increases the amplitude of the modulator 7 to the maximum level. Then, the power amplifier 6 amplifies the power of the signal from the modulator 7 and then supplies the resulting signal to the directional coupler 5. A signal from the directional coupler 5 is passed through the low-pass filter 4 to remove an unwanted high-frequency component. The continuous wave is then transmitted from the antenna 3 to the RFID tag.

To transmit data to the RFID tag, the RFID tag communication device 100 supplies the local signal generated by the PLL section 11 to the modulator 7 and then transmits transmission data from the control section 1 to the encoding section 30. The encoding section 30 encodes the data using, for example, the Manchester code or the FM0 code. The DAC 9 then converts the encoded data into an analog signal, which is then input to the modulator 7 via LPF 8. The modulator modulates the amplitude of the analog signal using the local signal. The amplitude modulated signal is transmitted through the power amplifier 6, the directional coupler 5, and the low-pass filter 4 and then from the antenna 3 to the RFID tag.

Upon finishing receiving data from the RFID tag communication device 100, the RFID tag then receives the continuous wave from the RFID tag communication device 100 and modulates the amplitude of the continuous wave by means of backscattering. The RFID tag then transmits a reply signal composed of, for example, a synchronizing section comprising bit synchronization or the preamble and a data section and an error detecting section which follow the synchronizing section.

The RFID tag communication device 100 receives the reply signal from the RFID tag via the antenna 3. Upon receiving the reply signal, the RFID tag communication device 100 allows LPF 4 to remove an unwanted high-frequency component from the reply signal. The RFID tag communication device 100 then inputs the resulting signal to each of the first and second mixers 12 and 13 via the directional coupler 5. The first mixer 12 uses the local signal from the PLL section 11 to generate an I-signal corresponding to a component that is in phase with the carrier signal. The second mixer 13 uses the local signal from the PLL section 11 shifted in phase through 90 degrees by the phase shifter 10 to generate a Q-signal corresponding to a component that is 90 degrees out of phase with the carrier signal.

The unwanted high-frequency component is removed from the I-signal from the first mixer 12 by the first LPF 16, and the remaining part of the I-signal is encoded into a data component. The first ADC 20 then converts the data component into a digital signal, which then passes through the digital filter 31. The signal is then subjected to data generation made by the data generator 33. The unwanted high-frequency component is removed from the Q-signal from the second mixer 13 by the second LPF 17, and the remaining part of the Q-signal is encoded into a data component. The first ADC 20 then converts the data component into a digital signal, which then passes through the digital filter 32. The signal is then subjected to data generation made by the data generator 36.

Data of the I-signal generated by the data generator 33 is input to each of the I-signal synchronizing clock generating section 38, I-signal preamble detecting section 39, and I-signal decoding section 40. Moreover, the decoding result from the I-signal decoding section 40 is input to the I-signal error detecting section 41. Data of the Q-signal generated by the data generator 36 is input to each of the Q-signal synchronizing clock generating section 42, Q-signal preamble detecting section 43, and Q-signal decoding section 44. Moreover, the decoding result from the Q-signal decoding section 44 is input to the Q-signal error detecting section 45. The I-signal preamble detecting section 39 calculates the correlation between the signal and the preset preamble pattern. The I-signal preamble detecting section 39 then compares the resulting correlation value with the threshold to detect the preamble of the I-signal. The Q-signal preamble detecting section 43 calculates the correlation between the signal and the preset preamble pattern. The Q-signal preamble detecting section 43 then compares the resulting correlation value with the threshold to detect the preamble of the Q-signal. The I-signal error detecting section 45 carries out error detection on the data in the I-signal. The Q-signal error detecting section 45 carries out error detection on the data in the Q-signal.

Figure 5:
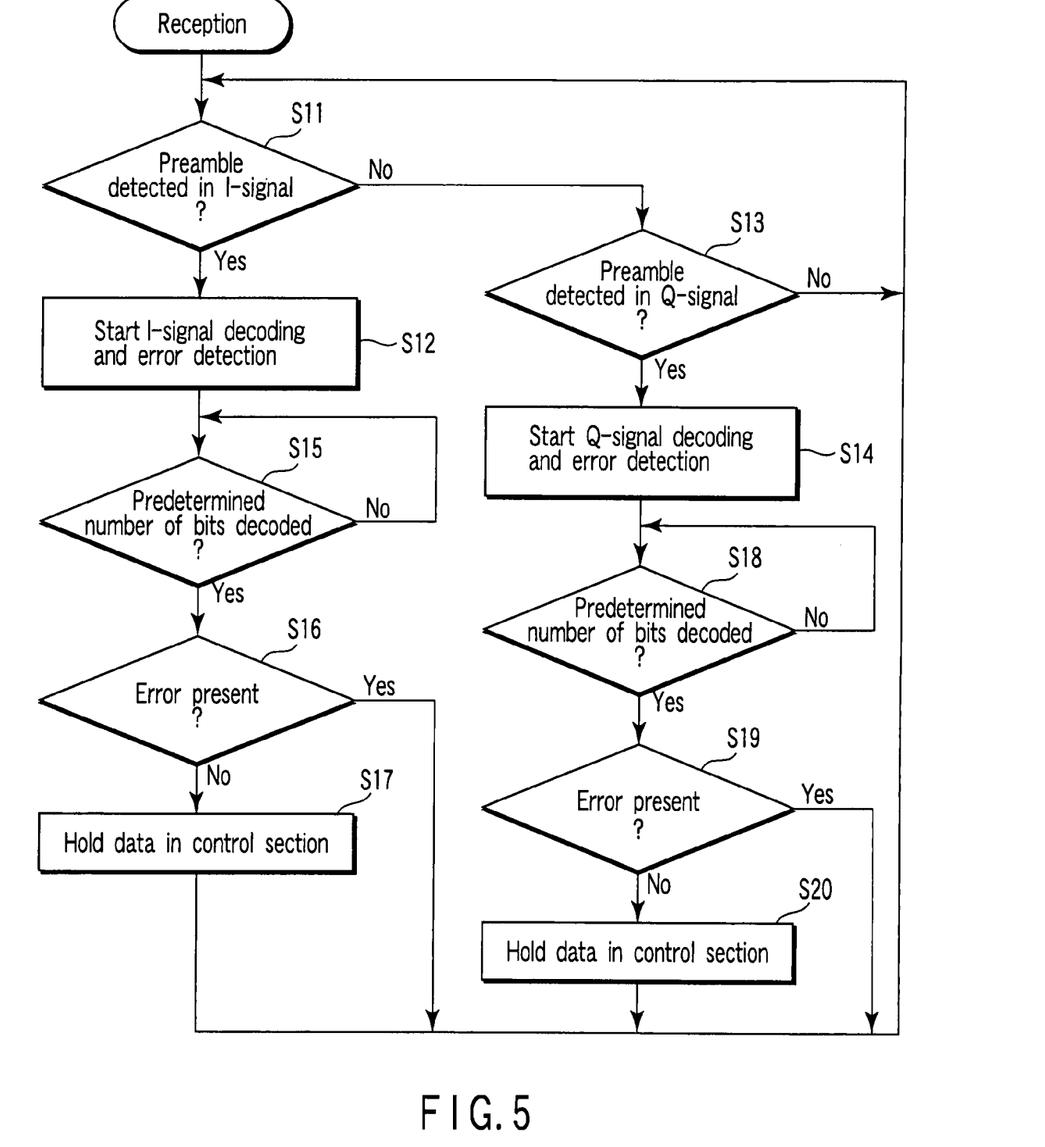
FIG. 5 is a flowchart showing second demodulation control in the RFID tag communication device shown in FIG. 1.

Then, as shown in the flowchart in FIG. 5, in S11, the control section 1 first checks whether or not the I-signal preamble detecting section 39 has detected the preamble of the I-signal. If the I-signal preamble detecting section 39 has detected the preamble of the I-signal, then in S12, the I-signal decoding section 40 starts decoding the data in the I-signal. The I-signal error detecting section 45 starts carrying out error detection on the data in the I-signal.

If the I-signal preamble detecting section 39 has failed to detect the preamble, the control section 1 checks whether or not the Q-signal preamble detecting section 43 has detected the preamble of the Q-signal. If the Q-signal preamble detecting section 43 has detected the preamble of the Q-signal, then in S14, the Q-signal decoding section 44 starts decoding the data in the Q-signal. The Q-signal error detecting section 45 starts carrying out error detection on the data in the Q-signal.

This means that even though each of the preamble detecting sections 39 and 43 detects the preamble, the specific pattern, one of the predetermined signals, that is, the I-signal, is decoded.

In S12, when the I-signal decoding section 40 starts decoding the data in the I-signal and the I-signal error detecting section 45 starts carrying out error detection on the data in the I-signal, the control section 1 checks in S15 whether or not a predetermined number of data bits have been decoded. If the predetermined number of data bits have been decoded, the control section 1 checks in S16 whether or not the I-signal error detecting section 45 has detected an error in the data in the I-signal. If the I-signal error detecting section 45 has not detected an error in the data in the I-signal, then in S17, the control section 1 holds the decoded data.

In S14, when the Q-signal decoding section 44 starts decoding the data in the Q-signal and the Q-signal error detecting section 45 starts carrying out error detection on the data in the Q-signal, the control section 1 checks in S18 whether or not a predetermined number of data bits have been decoded. If the predetermined number of data bits have been decoded, the control section 1 checks in S19 whether or not the Q-signal error detecting section 45 has detected an error in the data in the QI-signal. If the Q-signal error detecting section 45 has not detected an error in the data in the Q-signal, then in S20, the control section 1 holds the decoded data.

Thus, upon reception, once the preamble is detected in one of the I- and Q-signals, the data is decoded. This enables demodulating efficiency to be improved. Further, after the data decoding, error detection is carried out on the decoded data. If no error is detected, the decoded data is finally held, enabling the data to be reliably demodulated.

In the present embodiment, after the check on the detection of the I-signal preamble in S11, the decoding and error detection of the I-signal data are started in S12 without executing the check on the detection of the Q-signal preamble in S13, allowing the predetermined one of the signals to be decoded earlier than the other. However, the present invention is not limited to this. It is possible to decode earlier one of the I- and Q-signals having the preamble detected earlier.

Figure 6:
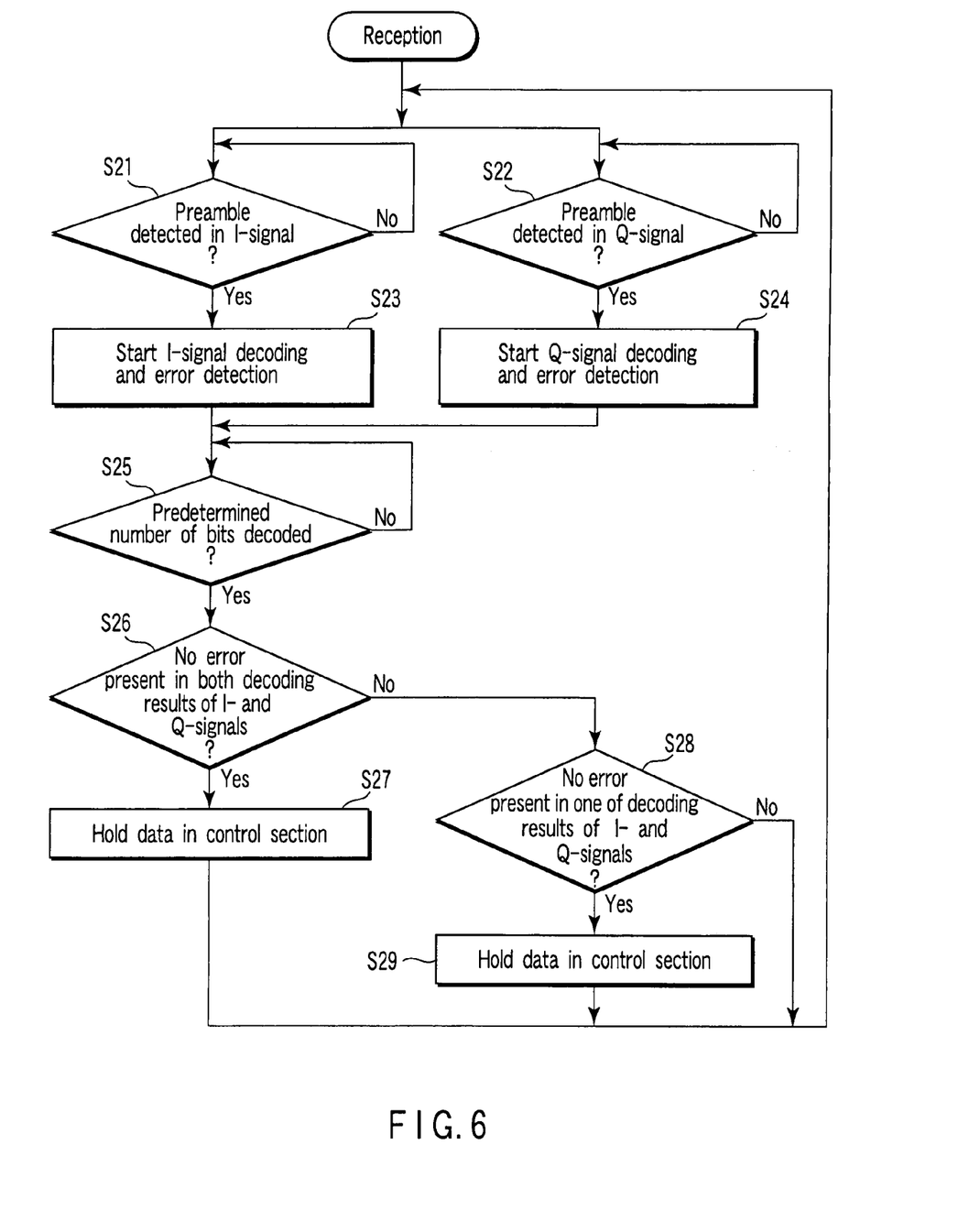
FIG. 6 is a flowchart showing another example of second demodulation control in the RFID tag communication device shown in FIG. 1.

In the present embodiment, the second demodulating circuit RP2 performs the detection of the I-signal preamble and then the detection of the Q-signal preamble. However, the detection of the I-signal preamble may be performed in parallel with the detection of the Q-signal preamble. That is, as shown in FIG. 6, the control section may check in S21 whether or not the I-signal preamble detecting section 39 has detected the I-signal preamble and check in S22 whether or not the Q-signal preamble detecting section 43 has detected the Q-signal preamble.

Then, when the I-signal preamble detecting section 39 detects the I-signal preamble, in S23, the I-signal decoding section 40 starts decoding the data in the I-signal and the I-signal error detecting section 45 starts carrying out error detection on the data in the I-signal. Further, in S24, the Q-signal decoding section 44 starts decoding the data in the Q-signal and the Q-signal error detecting section 45 starts carrying out error detection on the data in the Q-signal.

The control section 1 subsequently checks in S25 whether or not the predetermined number of data bits have been decoded for each of the I- and Q-signals. If the predetermined number of data bits have been decoded, the control section 1 checks in S26 whether the I-signal error detecting section 45 and the Q-signal error detecting section 45 have detected an absence of error in the data. If the absence of an error is detected in both the decoding results of the I- and Q-signals, the control section 1 holds the decoded data in S27. In this case, the decoded data held in the control section may be the predetermined one of the data in the I- and Q-signals or one of the data in the I- and Q-signals subjected to the error detecting process earlier.

If the absence of an error is not detected in both the decoding results of the I- and Q-signals, the control section 1 checks in S28 whether one of the I-signal error detecting section 45 and the Q-signal error detecting section 45 has detected absence of an error in the data. If the absence of an error is detected in one of the decoding results of the I- and Q-signals, the control section 1 holds the decoded data in S29. In this case, the decoded data held in the control section is one of the decoding results of the I- and Q-signals which is not erroneous.

With this demodulation control, upon reception, the data decoding and error detection are started after the preamble detection has been executed on both the I- and Q-signals. Subsequently, after detecting that the predetermined number of data bits have been decoded for one of the I- and Q-signals, the control section 1 holds the decoded data. This enables the demodulation efficiency to be improved. Moreover, after the data decoding, the error detection is carried out on the decoded data, and the decoded data is finally held when no error is detected. This enables the data to be reliably demodulated.

The first and second demodulating circuits RP1 and RP2 operate in parallel. Upon starting reception, the RFID tag communication device 100 allows the first and second demodulating circuits RP1 and RP2 to start demodulation. Then, in S31 in FIG. 7, the control section 1 determines the gain of the AGC 46. If the gains of the first and second variable gain amplifiers 18 and 19 are smaller than a predetermined value, then in S32, the control section 1 decodes and adopts the data from the first demodulating circuit RP1, that is, the reception data generated by the process of squaring each of the I- and Q-signals and adding the resulting signals together. The set predetermined value indicates that the amplitudes of the I- and Q-signals are both equivalent to the amplitude of noise. On the other hand, the gain of the AGC 46 is determined, and if the gains of the first and second variable gain amplifiers 18 and 19 are greater than a predetermined value, then in S33, the control section 1 decodes the data from the second demodulating circuit RP2, that is, determines the preamble of each of the I- and Q-signals and decodes the data following the correctly detected signal. S31 to S33, described above, constitute a selecting function section that selects one of the first and second demodulating circuits RP1 and RP2, that is, selecting means.

Figure 7:
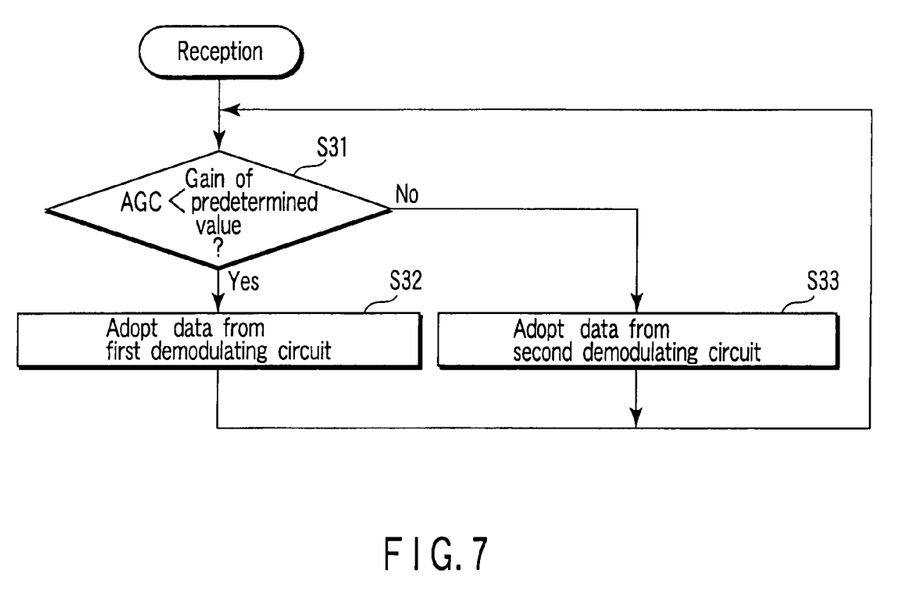
FIG. 7 is a flowchart showing control of the selection between first demodulation control and the second demodulation control in the RFID tag communication device shown in FIG. 1.

The RFID tag communication device 100 comprising the quadrature demodulator determines the gain of the AGC 46 on the basis of the result of the addition between the value of the squared I-signal and the value of the squared Q-signal. On the basis of the gain of the AGC 46, the RFID tag communication device 100 then switches between the two types of demodulating circuits (first and second demodulating circuits RP1 and RP2). That is, when the gain of the AGC 46 is smaller than the predetermined value, the data demodulated by the first demodulating circuit RP1 is adopted. When the gain of the AGC 46 is at least the predetermined value, the data demodulated by the second demodulating circuit RP2 is adopted. This enables the adverse effect of noise to be minimized even with the reduced level of the reception signal, allowing a reduction of the possible noise-induced incorrect reproduction of reception data.

Further, when the gain of the AGC 46 is smaller than the predetermined value, the first demodulating circuit RP1 is selected. That is, when the gain of the AGC 46 is smaller than the predetermined value, the amplitudes of the I- and Q-signals are both equivalent to the amplitude of noise, that is, the reception level is low. Thus, a demodulating process is executed by selecting the first demodulating means, the original demodulating circuit RP1 that allows the data generating section 47 to generate data using the values of the squared I- and Q-signals, respectively.

The present invention is not limited to the above embodiment per se. At an implementation stage, the components of the embodiment may be varied without departing from the spirits of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A quadrature demodulator comprising reception means for receiving a signal transmitted by an RFID tag and containing a specific pattern and data following the specific pattern, multiplying the reception signal by a local signal to generate an I-signal, and multiplying the reception signal by the local signal shifted in phase by 90 degrees to generate a Q-signal, first demodulating means, and second demodulating means, the first demodulating means comprising an I-signal squaring section which squares the I-signal, a Q-signal squaring section which squares the Q-signal, an adding section which adds the output from the I-signal squaring section to the output from a Q-signal squaring section, an automatic gain control section which controls gain of the I- and Q-signals on the basis of a value from the adding section, and a data generating section which generates data by inverting a signal level of a signal output by the adding section every time the value of the signal becomes equal to or greater than a predetermined threshold or smaller than a predetermined threshold, the second demodulating means comprising I-signal specific-pattern detecting means for detecting the specific pattern in the I-signal, Q-signal specific-pattern detecting means for detecting the specific pattern in the Q-signal, and decoding means for decoding the data following the specific pattern detected by one of the specific-pattern detecting means, the quadrature demodulator being configured to select one of the first demodulating means and the second demodulating means in accordance with a gain of the automatic gain control section.

2. The quadrature demodulator according to claim 1, wherein the second demodulating means is configured to decode the data in a predetermined one of the signals.

3. The quadrature demodulator according to claim 1, wherein the second demodulating means is configured to decode the data following the specific pattern detected earlier.

4. The quadrature demodulator according to claim 1, wherein the I-signal specific-pattern detecting means calculates a correlation between the I-signal and the specific pattern, and when the correlation value is at least a predetermined threshold, determines that the specific pattern has been detected, and the Q-signal specific-pattern detecting means calculates a correlation between the Q-signal and the specific pattern, and when the correlation value is at least a predetermined threshold, determines that the specific pattern has been detected.

5. The quadrature demodulator according to claim 1, wherein the second demodulating means comprises I-signal decoding means for decoding the data following the specific pattern in the I-signal detected by the I-signal specific-pattern detecting means, Q-signal decoding means for decoding the data following the specific pattern in the Q-signal detected by the Q-signal specific-pattern detecting means, I-signal error detecting means for detecting an error in the data using an error detection code contained in the I-signal decoded by the I-signal decoding means, and Q-signal error detecting means for detecting an error in the data using an error detection code contained in the Q-signal decoded by the Q-signal decoding means, and the second demodulating means outputs the decoded data in which no error has been detected.

6. The quadrature demodulator according to claim 5, wherein the second demodulating means is configured so that when neither the I-signal error detecting means nor the Q-signal error detecting means has detected an error, the second demodulating means outputs a predetermined one of the decoded data.

7. The quadrature demodulator according to claim 5, wherein the second demodulating means is configured so that when neither the I-signal error detecting means nor the Q-signal error detecting means has detected an error, the second demodulating means outputs the decoded data subjected to the error detecting process earlier.

8. A quadrature demodulator comprising reception means for receiving a signal transmitted by an RFID tag and containing a specific pattern and data following the specific pattern, multiplying the reception signal by a local signal to generate an I-signal, and multiplying the reception signal by the local signal shifted in phase by 90 degrees to generate a Q-signal, first demodulating means for squaring each of the I- and Q-signals and adding the resulting I- and Q-signals together to generate data on the basis of the addition result, second demodulating means for detecting the specific pattern in each of the I- and Q-signals to decode the data following one of the detected specific patterns, and selecting means for selecting one of the first demodulating means and the second demodulating means in accordance with a gain determined by the addition result.

9. The quadrature demodulator according to claim 8, wherein the selecting means is configured to select the first demodulating means when a value for the gain is smaller than a predetermined value.

10. The quadrature demodulator according to claim 9, wherein the predetermined value indicates that amplitudes of the I- and Q-signals are both equivalent to an amplitude of noise.

11. The quadrature demodulator according to claim 10, wherein the first demodulating means comprises an I-signal squaring section which squares the I-signal, a Q-signal squaring section which squares the Q-signal, an adding section which adds an output from the I-signal squaring section to an output from a Q-signal squaring section, an automatic gain control section which controls gain of the I- and Q-signals so that a gain determined by an addition result from the addition section is obtained, and a data generating section which generates data by inverting a signal level of a signal output by the adding section, with respect to a predetermined threshold used as a reference, and the second demodulating means comprises I-signal specific-pattern detecting means for detecting the specific pattern in the I-signal, Q-signal specific-pattern detecting means for detecting the specific pattern in the Q-signal, and decoding means for decoding the data following the specific pattern detected by one of the specific-pattern detecting means.

12. The quadrature demodulator according to claim 9, wherein the first demodulating means comprises an I-signal squaring section which squares the I-signal, a Q-signal squaring section which squares the Q-signal, an adding section which adds an output from the I-signal squaring section to an output from a Q-signal squaring section, an automatic gain control section which controls gain of the I- and Q-signals so that a gain determined by an addition result from the addition section is obtained, and a data generating section which generates data by inverting a signal level of a signal output by the adding section, with respect to a predetermined threshold used as a reference, and the second demodulating means comprises I-signal specific-pattern detecting means for detecting the specific pattern in the I-signal, Q-signal specific-pattern detecting means for detecting the specific pattern in the Q-signal, and decoding means for decoding the data following the specific pattern detected by one of the specific-pattern detecting means.

13. The quadrature demodulator according to claim 8, wherein the first demodulating means comprises an I-signal squaring section which squares the I-signal, a Q-signal squaring section which squares the Q-signal, an adding section which adds an output from the I-signal squaring section to an output from a Q-signal squaring section, an automatic gain control section which controls gain of the I- and Q-signals so that a gain determined by an addition result from the addition section is obtained, and a data generating section which generates data by inverting a signal level of a signal output by the adding section, with respect to a predetermined threshold used as a reference, and the second demodulating means comprises I-signal specific-pattern detecting means for detecting the specific pattern in the I-signal, Q-signal specific-pattern detecting means for detecting the specific pattern in the Q-signal, and decoding means for decoding the data following the specific pattern detected by one of the specific-pattern detecting means.

* * * * *